Figure 1:
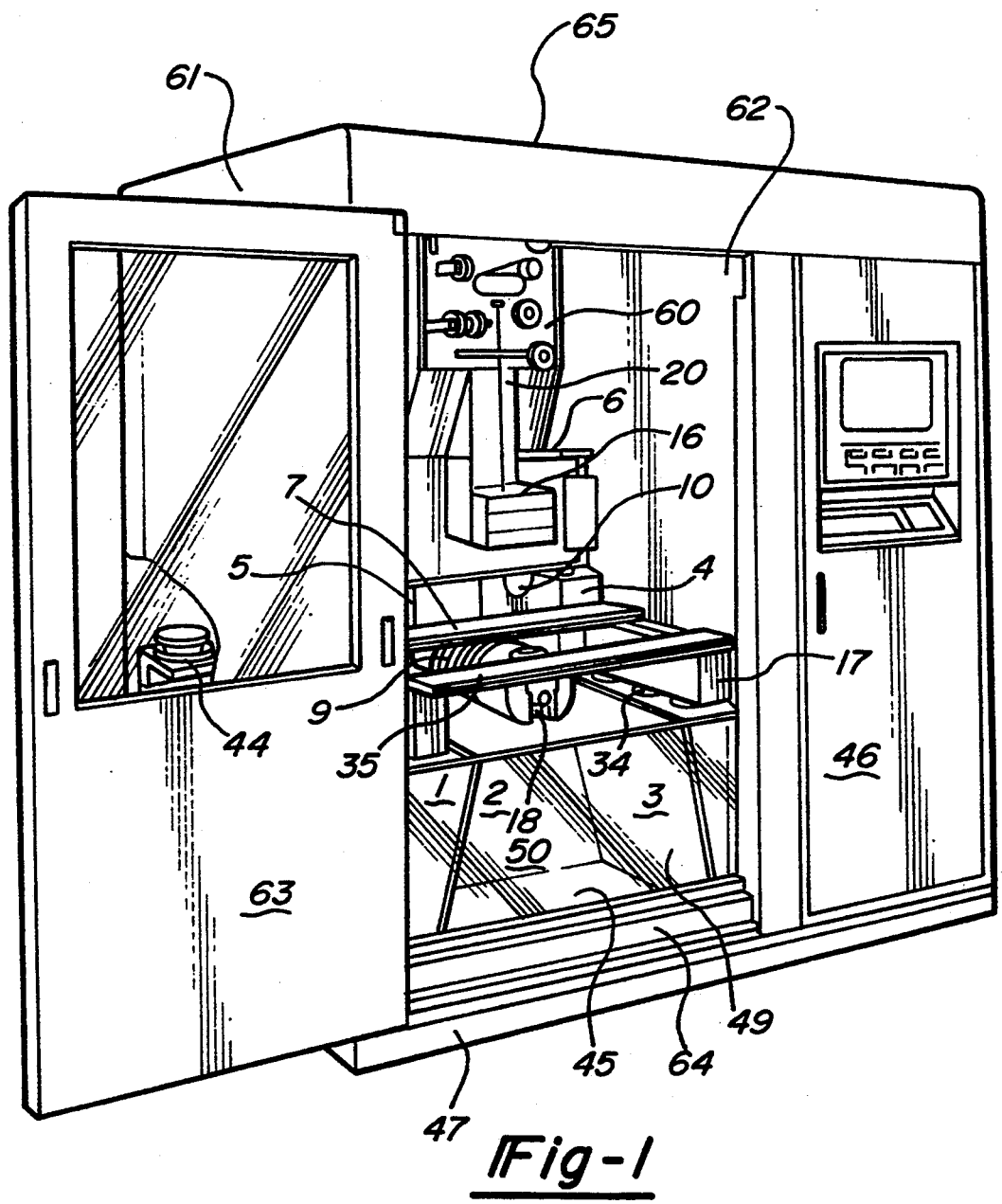

United States Patent [19]
Lehmann

[11] Patent Number: 5,410,119
[45] Date of Patent: Apr. 25, 1995

[54] THERMOSTABLE WIRE CUTTING ELECTRO-EROSION MACHINE

[75] Inventor: Hans Lehmann, Vessy, Switzerland

[73] Assignee: Charmilles Technologies SA, Switzerland

[21] Appl. No.: 891,799

[22] Filed: Jun. 1, 1992

[30] Foreign Application Priority Data

May 31, 1991 [CH] Switzerland .............. 01 623/91

[51] Int. Cl.6 ............................ B23H 1/00; B23H 7/02
[52] U.S. Cl. ........................................... 219/69.12
[58] Field of Search ................. 219/69.11, 69.12, 69.14

[56] References Cited

U.S. PATENT DOCUMENTS

| | | | |
|---|---|---|---|
| 3,928,163 | 12/1975 | Ullmann et al. | 219/69.12 |
| 4,521,661 | 6/1985 | Inoue | 219/69.12 |
| 4,792,653 | 12/1988 | Futamura | 219/69.12 |
| 4,952,767 | 8/1990 | Uemoto et al. | 219/69.12 |
| 5,070,224 | 12/1991 | Topfer et al. | 219/69.12 |

FOREIGN PATENT DOCUMENTS

| | | | |
|---|---|---|---|
| 2018130 | 5/1970 | France | 219/69.14 |
| 55-83528 | 6/1980 | Japan | 219/69.12 |
| 60-161030 | 8/1985 | Japan | 219/69.12 |
| 62-264830 | 11/1987 | Japan | 219/69.12 |
| 63-144916 | 6/1988 | Japan | 219/69.11 |

*Primary Examiner*—Geoffrey S. Evans
*Attorney, Agent, or Firm*—Gifford, Groh, Sprinkle, Patmore and Anderson

[57] ABSTRACT

A wire cutting electroerosion machine with upper and lower machining heads on cross slide systems for taper machining. The upper and lower machining heads spray a dielectric liquid at the machining zone. A reservoir and filter elements are used to recycle the liquid and resupply the liquid to the machining zone. An enclosed enclosure means is used to reduce temperature variations during machining by enabling dissipation of the heat given off and to facilitate uniform temperature distribution throughout the equipment by achieving thermal equilibrium.

10 Claims, 2 Drawing Sheets

THERMOSTABLE WIRE CUTTING ELECTRO-EROSION MACHINE

This invention concerns a constant-temperature machine, spray or immersion operation, for electrical discharge machining with a wire-electrode, in which a dielectric liquid is injected into the machining zone from two machining heads, is collected in a tank, then recycled to these heads.

Well-known machines for cutting by electro-erosion using a wire-electrode most often comprise a work table on which is fixed the workpiece-electrode to be machined as well as its clamping system, the whole immersed in a work tank collecting the dielectric liquid. The wire-electrode moves between two machining heads situated on either side of the piece to be machined and moves through the machining zone, that is to say the slot cut in this workpiece. It moves forward in the latter according to the planned trajectory owing to a relative movement between the two electrodes and can also slant with respect to the vertical, through a preset angle. Each machining head has a wire guide and injects machining liquid between the wire and the workpiece in order to cool them and to flush away waste. This relative movement is obtained by moving either the workpiece, or the heads, and the inclination of the wire by shifting the heads with respect to one another. In general, these movements are carried out in two horizontal planes, on either side of the machining zone, owing to two cross-slide systems. These latter, as well as the machining trough, the arms carrying the machining heads, often the devices for wire feeding and removal, are mounted on a frame. The work table can be fixed directly on this frame or on one of the cross-slide systems., the latter resting on the base of this frame, and thus serve as the bottom of the machining trough. An EDM machine is also equipped with a circuit for dielectric supply and recycling, one or more electrical cabinets containing an electrical pulses generator and a numerical control unit, as well as a collector for the used wire, connecting to devices appropriate for evacuating of the wire to this collector or receptacle, at the outlet from the machining zone. In spray machining, it is necessary in addition to provide for anti-splash screens or protection of various kinds, depending on the manufacturer, in general to be fixed to the upper arm.

Machining by electro-erosion using intermittent electrical discharges (EDM) generates a lot of heat; furthermore, this type of machining is relatively long. This is why temperature variations exert a great influence in EDM machining, thermal deformations being able to affect its precision and reproducibility. These deformations can be due to the heat given off by certain devices (such as pumps, motors operating the crosswise movements systems moving the machining heads and/or the workpiece to be machined along controlled trajectories, the pulse generator, the numerical control unit, etc..), as well as changes in the ambient temperature.

The use of materials such as ceramics with low thermal deformation, or regulation of the temperature of the dielectric liquid machining bath have not succeeded in eliminating this problem. Thermal deformation of the workpiece to be machined and its clamping system play a part, but it is known that the lack of precision is above all the result of different thermal deformation for each of the crosswise movements devices which move the machining heads along controlled trajectories, and for their mountings on the machine frame.

The first object of this invention is therefore to reduce the amplitude of the temperature variations by enabling dissipation of the heat given off and also to facilitate uniform temperature distribution throughout the equipment by achieving thermal equilibrium.

It also aims to create a machine that:
- is compact and economical,
- has total safety for the operator, and
- considerably increases his comfort.

It is well known that a structure allowing ambient air to circulate freely around various elements of this equipment, (such as that described in U.S. Pat. No. 3,469,058), facilitates dissipation of the heat given off. Certain manufacturers have even proposed ventilating with cold air the interior of the frame or the arms carrying the heads (U.S. Pat. No. 4,698,477 or JP 63-35367).

In machining by immersion, when the energy used is not too great, it is possible to alleviate this disadvantage by controlling the temperature of the dielectric liquid. But in this case of spray EDM machining, the level of liquid in the work trough is relatively low, the trough receiving only the liquid sprayed between the electrodes. In the case of submersion EDM, certain manufacturers have even proposed immersing the column carrying the electrode supports in the machining liquid filling the work trough, as described in FR 1,326,482, for example. But for the powers now being brought into play, it has become difficult to refrigerate the dielectric sufficiently. Furthermore, for safety reasons, the above solution is difficult to apply to EDM machining with a wire, where the machining liquid is no longer an insulating liquid like oil, but water.

This invention has allowed creation of a machine for cutting with a wire-electrode in which one enables dissipation of the heat given off and one produces thermal equilibrium.

Therefore, a machine according to the present invention for cutting by electro-erosion a stationary workpiece with a wire-electrode guided by two machining heads from which dielectric liquid is injected into the machining zone, with a frame on which are mounted cross-slide systems operating two arms each terminated by one of the machining heads so as to control the relative movement between the wire and the workpiece and the slanting of the wire, with means fitted to feed the machining heads with dielectric liquid and to recycle it to these heads and with one or more electrical cabinets containing a numerical control unit and an electric pulses generator comprises
- a system for clamping the workpiece mounted on pillars fixed directly to the frame stand, without the intermediary of a work table and a work tank,
- a frame stand is made of vertical elements arranged so as to allow free access to the space which they delimit with the floor and this clamping system,
- a chamber tight against liquids arranged around the machine frame, and
- a tank known as the "dirty reservoir" or "contaminated tank", since it is intended to collect the used dielectric machining liquid and the used wire, placed on the floor of this chamber, between or around said elements of the base of the frame stand.

It is therefore a machine in which the machining liquid is not collected in a work trough located in the machining zone, but in a reservoir put at the bottom of the frame base. The chamber obviously allows the machining zone to be removed from the influence of external temperature variations and the internal air to be brought to temperature equilibrium and conditioned or thermostatically controlled if necessary; furthermore, it is an excellent protection against the splashing inherent in spray machining, and above all allows elimination of the work trough and the work table, thus leaving the base open, the workpiece to be machined and its clamping system being located above; the air from the chamber, possibly thermostatically controlled, can thus circulate freely around the workpiece to be machined, and its clamping system, the arms with their machining head and the part of the frame near the machining zone, this even more than the base composed of vertical elements arranged so as to allow free access to the "dirty" tank. One thus enables dissipation of the heat given off in these devices. One can also cool them in a "bath" of air by blowing for example cold air towards the machining zone. One can also provide for air-convection devices to enable this circulation and speed up the establishment of thermal equilibrium. By appropriate control of the ambient air in the chamber, one can appreciably reduce and sometimes even practically eliminate positional changes relative to the workpiece and the two machining heads because of temperature variations between these devices. Furthermore, the volume of air thus controlled makes a screen around the machining zone, which is no longer influenced by the heat given off by the electrical cabinets.

Moreover, one can let the wire find its way (or fall, if it is cut into small sections), at the outlet from the lower machining head, into the base; the used wire therefore comes to accumulate in the "dirty" spray liquid collected in the bottom of the base. In the case where the wire is not cut at the outlet from the machining zone, the length of used wire cools down in contact with the liquid and this cooling is transmitted to the section moving through the machining zone, thus reducing the risk of wire breakage. Finally, in machining by spraying, as the chamber is an excellent protection against splashes, one can to a large extent increase the injection pressure of the spray liquid, which allows the flow to be increased therefore further accelerating cooling of the electrodes and machining heads, and therefore limiting the heat given off in the equipment.

By "chamber" one understands an assembly of high walls rising higher than the frame of the machine, surrounding an under frame acting as a floor, and either covered or not by a "roof", the latter being essential when it is planned to thermostatically control the temperature of or provide for air conditioning for this chamber. In the case of a chamber forming a Faraday cage, a solid roof can be replaced by, or have added to it, an appropriate metal grill. This chamber can have a front door, sliding for example, provided with appropriate means of sealing against liquids. It can have other side openings protected by panels which can slide sideways or up and down, or have openings in the roof in order to allow loading of workpieces from above.

It can have walls capable of being lifted in a single assembly from the machining zone. These walls can be detachable but form a sealed assembly with the chamber floor, so as to allow immersion machining. Certain side openings can be provided to allow a long workpiece to go in as far as the machining zone to be cut into lengths, for example. It can extend around all or part of the dielectric circuit and even include or be linked to the electrical cabinet(s) containing the pulse generator and the numerical control [system]. It can be advantageous to arrange the front of the electrical cabinet carrying the numerical control screen on the same side of the chamber as the front door. To increase the operator's comfort, this screen can be put at a slight angle, or even be swivelling in order to facilitate monitoring.

It can have all sorts of means, of known types, to control the air it contains, for example means of air conditioning, ventilation, temperature regulation, to suck up smoke, odours, mist, to blow in cold air or create air convection.

It can also be provided with thermal or acoustic insulation panels, means of lighting; the under-frame can have anti-vibration devices and the door(s) or opening panels have anti-mist windows.

According to certain variants, the "dirty" liquid reservoir can be a tank in which the base stands as well as certain elements of the dielectric liquid supply circuit. It is surrounded by a side wall, the rear wall and the front wall with chamber door, as well as the internal wall separating the machining space from the electrical cabinet(s).

Well-known devices suck out the "dirty" liquid, channel it through a filtration system, also of a well-known type, to a reservoir intended for clean liquid. Other appropriate means regulate the temperature and pressure of the clean liquid and convey it to the machining heads.

This tank together with all the other components of the machine, including the electrical cabinet containing the pulses generator and the numerical control unit, may be installed on the same chassis or "pallet". The various components of the machine are integrated at the time of assembly during manufacture, which greatly facilitates the installation of the said machine. Similarly, it is very convenient to transport. Its operating costs are decreased, as the ground area is very much less than that for similar known machines.

According to another particularly advantageous method of execution, a separation can isolate the machining zone from the mechanical devices providing the drive for the movements of the machining heads, in particular a wall which only allows passage of the arms terminated by the machining heads. It can be connected to the chamber walls and delimit three boxes isolated from one another: a volume comprising the electrical cabinet(s), provided with appropriate air conditioning and ventilation; a so-called "clean" part where mechanical devices effect movement of the machining heads and possibly of the workpiece to be machined, which can be protected from the mist prevalent in the machining zone and whose temperature can be regulated in the desired manner; one can provide for means for establishing an overpressure in this enclosure so that the mist caused by the spray liquid does not get in. The pulse generator can advantageously be installed in this "clean room", for example in the crossbeam separating the crosswise movements systems, and thus being very close to the machining zone, which will very advantageously shorten the cables connecting it to the electrodes. Finally, a "dirty" space with the machining zone and the hollow base of the machine with the "dirty" liquid and possibly the used wire.

As a first variant, the cross-slide systems may be arranged as described in patent application DOS 38 41 314, i.e. above and below a single horizontal crossbeam resting on two shoulders of the stand. But this invention is not in the least restricted to this particular structure.

Many other variants are described in (application E 212). Gantry-type or so-called "C" structures, with or without a fixed machining room, can be used for the frame.

The cross-slide movements systems may be of any known design which provide durable long life and high precision movement e.g. of the needle type such as the pretensioned W guideways equipped with a needle cage; with mechanical, hydraulic or pneumatic drives; with sliding rails and saddle slide carriages; with carriages and tracks which are adjustable if necessary. They may be fitted with anti-collision systems on all the axes which detect, for example, any irregular force greater than some tens of kilogramms. The actual position of each carriage or saddle slide carriage may be estimated by angle encoders situated at the and of each bolt which moves the saddle slide carriage. But with the help of precision digital (optical) linear guides which enable the path sliced through the piece to be determined with precision, it is preferable to couple it level with the piece, directly. Moreover, software for the correction of this position, for example, by a precision laser measurement of the position of the coordinates X1, Y1, X" and Y2, may be provided together with a customized software programme for the autocorrection of the machine.

A device to cut the used wire into pieces or crimp or curl it, such as those widely used in practice, may be fixed to the lower arm or machining head.

A structure according to this invention has many advantages other than those relating to thermal stability:
- better protection against splashes,
- total safety for the operator and
- complete simplicity and comfort for the user.

Furthermore, as the "dirty" liquid reservoir can equally serve as a receptacle for used wire, one can eliminate this as well as belt or compressed fluid systems that are present on well-known machines for transporting this used wire to the rear of the machine. One thus obtains a more simple and more compact machine (therefore much more economic).Remember that the work table and machining trough have also been eliminated, as well as the devices and software associated with the emptying of this trough and the auxiliary anti-splash protection.

The absence of a tank around the workpiece gives a less cluttered structure.

Access to the machining zone to fix or take off the workpiece to be machined is easier and quicker since there is no trough to empty or to retract nor door whose opening has to be controlled. The chamber also provides safety for the equipment by stopping any flow or impact originating from neighbouring machines, as well as providing a screen against certain external stresses. Finally, it is easy to clean, by unskilled personnel, since there are no anti-splash devices to be dismounted.

Below, the invention is illustrated in greater detail with the help of drawings representing only one of the advantageous embodiements as a simple open-ended example. Any modification to the shape or points of detail may be made to the said machine without compromising the spirit of the invention.

Figure 2:
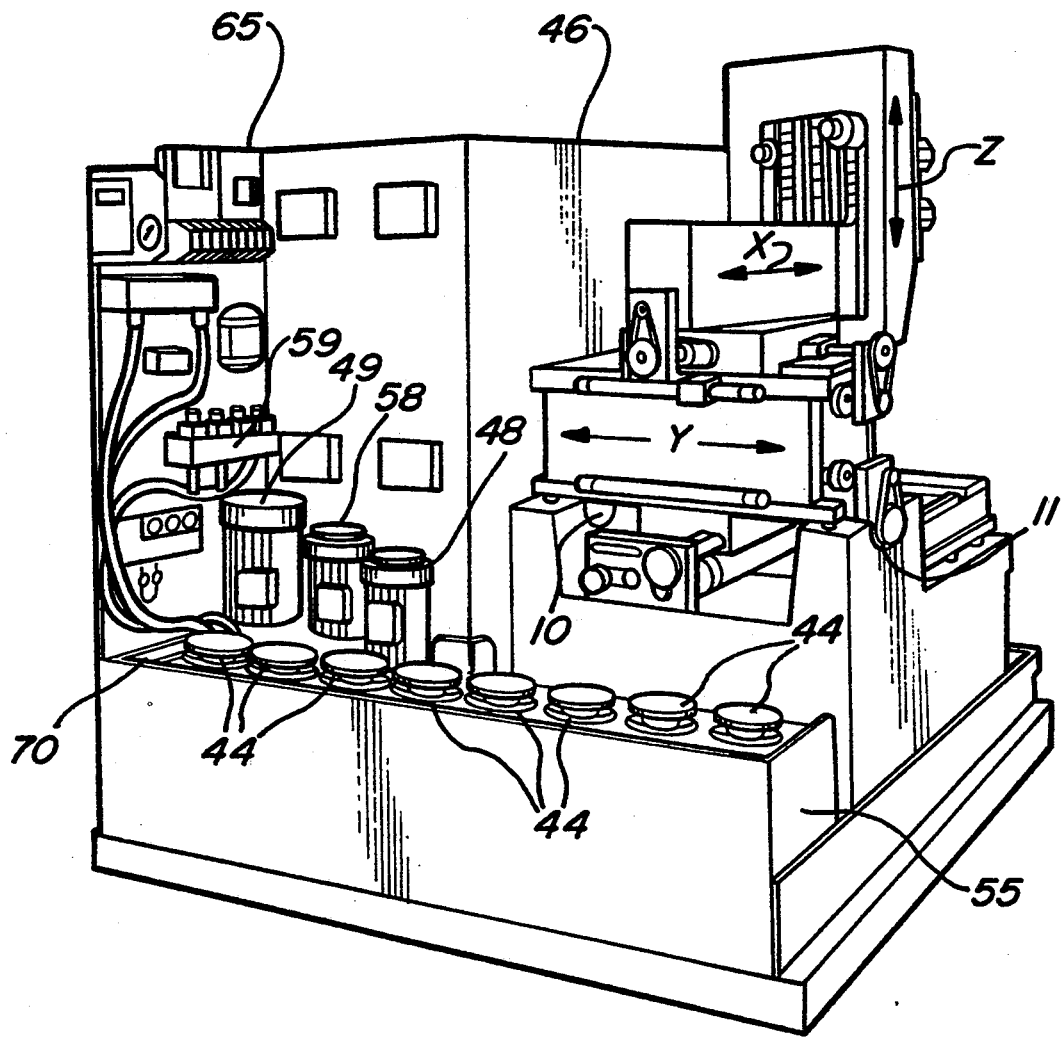

FIG. 1 is a simplified view of the frontal part and of one of the sides of the machine main frame of the said invention. FIG. 2 is a view of the rear part and one of the sides of the machine illustrated in FIG. 1.

The same reference numbers are used in all three figures to identify identical parts.

The frame of the machine according to this invention represented in the drawing has been described in detail in the Swiss patent application 1622/91.

The stand is made of Rhenocast (R) (a trademark designating a polymerized concrete of the company, George Fischer). This unalterable material which is unalterable and rustproof and also acts as a thermic and electrical insulator, is most suitable for this use, because the base is intended to be in contact with the used dielectric fluid and the electrically charged electrode wire which comes out of the lower machining head 18. Its density is only a third of that of steel for a comparable thermic expansion coefficient, 1 2 $\mu$m/degree/mn, This base could, however, be manufactured from any other known material for this use: cast iron, brazen steel, hydraulic concrete, ceramic, etc.

The recesses 10 and 11 in shoulders 4 and 5 house the movement bolt, which activates the saddle slide carriage 7 fitted to move the lower arm 9 with the machining head 18 along axis X1. This arm 9 extends a second sliding ram 14 (not visible in FIG. 1) intended to move it along axis Y1. Two other sliding rams are mounted above the crossbeam 6, symmetrically with sliding cranks 7 and 14, and are intended to move the arm carrying the machining head 19 along axes X2 and Y2. The guide rails on which these four sliding rams run are of the prestressed double "V" type, with needle bearing housings.

The saddle slide carriage 15 is prolonged by the upper arm (not visible in FIG. 1) and carries a vertical part 16 which contains a device 20 of a known kind, only the covering of which is visible in FIG. 1. The former activates the upper machining head 19 to slide along a rack arranged along the axis Z. This vertical part also supports the various wire-electrode supply mechanisms (plate 60).

The crossbeam 6 and the carriages 7, 8, 14 and 15 are made of cast iron. They could however be made of any other known material for this purpose: soldered steel, cast iron, ceramic, etc.

Two granite pillars 17 and 21 are, with the aid of six elements 34, secured on the upper surface of the sides 1 and 3, which are positioned below the shoulders 4 and 5. They are fitted with a rail suitable for supporting the clamping system components of a known type; shown here are the grooved rails 35 and 36 of a CT1000 SYSTEM. A transparent and movable protective wall, 49 closes up laterally the area 50 set between the bottom of vat 45 and the machining head 18, where the used wire piles up.

The spray liquid flows into the tank 45. The machine base and parts necessary for supply and recycling of the dielectric liquid, such as the battery of filters 44, are located in this tank 45. This and the electrical cabinet 46 containing the pulse generator and the numerical control unit are fixed to the common pallet 47. The tank 45 is surrounded by the side wall 61 and the rear wall (not visible in the drawing) of the chamber, the internal wall 62 separating the machining space from the electrical cabinet 46 and the sliding door 63, all surmounted by the roof 65 which also covers the cabinet 46. Across head guide 64 allowing the latter to slide is fixed to the edge of this tank 45.

Thus the machining heads 18 and 19 may adopt any position in relation to the work piece, each independently of the other. It is possible to slant the wire of more than 30° in a workpiece that has a height of 400 mm. The transverse movement of the lower machining head is restricted only by the internal face of the sides 1 and 3 of the base. That of the upper machining head 19 is limited only by the length of the crossbeam. The movement of the machining heads 1a and 19 along axes Y1 and Y2 is limited only by their thickness and that for the upper head 19, by that of the saddle slide carriage 16. The two crosswise movements systems 7,8 and 14,15 are very rigid and allow precise, reproducible cutting.

In this example, the two cross movement systems 7, 8, and 14, 15 are identical, Their travel along X and Y is 400 mm and 250 mm respectively. It is possible to machine a workpiece that has a height of up to 400 mm, a length of 850 mm, a width of 500 mm and weighs over 500 Kg This machine is actually very compact (3m2). It covers a floor area of 1.8 m×1.6 m and is 2.23 m high. Finally, we would like to mention, that a workpiece that has a length of 60 mm can be machined at a speed of 250 mm2/mm by means of a laminated wire whose diameter is 0,3 mm.

FIG. 2 is a rear view of the machine shown in FIG. 1 in which the walls of the chamber, except that extending the external side of the electrical cabinet 46, have been left out in order to show the arrangement of the dielectric machining liquid supply and recycling circuit elements. This circuit has only two reservoirs, the tank 45 which serves as a reservoir for the "dirty" liquid by collecting the spray liquid which flows from the machining zone and a reservoir 55 for the clean liquid surmounted by a battery of eight filters 44. A pump 48 draws the "dirty" liquid into a pipe (not visible in the drawing) taking it, through the battery of filters 44, to the reservoir 55 intended for clean liquid.

By means of the pipes 70, a pump 49 recycles the "clean" liquid to the machining heads.

The auxiliary pump 58 is intended for low-pressure injection, for suction for automatic wire threading, as well as for wetting the contacts.

Pressure sensors (not visible in the drawing), are provided in order to supply information on the actual spraying pressure, as well as the valves 59 and solenoid valves 65 allowing this pressure to be controlled and varied at will.

It goes without saying that changes can be made to the modes of construction which have just been described notably by substitution of technical equivalents, without leaving the framework of this invention to do so.

I claim:

1. A machine for cutting by electro-erosion a stationary workpiece with a wire-electrode, said machine comprising:
   a frame;
   an upper machining head connected to a first cross-slide system of said frame;
   a lower machining head connected to a second cross-slide system of said frame;
   spraying means for spraying a dielectric liquid to a machining zone formed between said upper and lower machining heads;
   a reservoir for collecting said liquid fed to said machining zone between said upper and lower machining heads;
   filter means for filtering said liquid drawn from said reservoir;
   means for resupplying said filtered liquid to said machining zone; and
   enclosure means for defining an enclosed enclosure means around said machining zone and creating a temperature climate-controlled environment within said chamber, said enclosure means providing a liquid-tight seal for said chamber to prevent the escape of dielectric fluid from said chamber.

2. The machine according to claim 1, in which said enclosure means has a roof.

3. The machine according to claim 1 in which said enclosure means acts as a Faraday cage.

4. The machine according to claim 1, in which said enclosure means has means for ventilation, air conditioning, convection and thermostatic control of the air that it contains.

5. The machine according to claim 1, in which said enclosure means has means for pressurizing and extracting air contained within said chamber.

6. The machine according to claim 1, in which said reservoir is fixed on a pallet on which are also fixed other components of the machine, said components including a pulse generator and a numerical control unit contained in one or more electrical cabinets.

7. The machine according to claim 6, also including a wall arranged so as to only allow passage of arms upon which said upper and lower machining heads are mounted so as to isolate the machining zone from the part of said enclosure means containing said cross-slide systems and said components operating them.

8. The machine according to claim 7, in which the part of said enclosure means containing said cross-slide systems has means for establishing a difference of pressure with respect to the machining zone.

9. The machine according to claim 7, in which the part of said enclosure means containing said cross-slide systems also contains said electric pulse generator connected to the electrodes.

10. The machine as described in claim 1, further comprising a second reservoir for collecting said dielectric liquid after passing through said filtering means and prior to said resupply to said spraying means, whereby the machine has substantially uniform temperature distribution by achieving thermal equilibrium during machining.

* * * * *